(12) United States Patent
Liu et al.

(10) Patent No.: US 12,394,149 B2
(45) Date of Patent: Aug. 19, 2025

(54) METHOD, ELECTRONIC DEVICE, AND COMPUTER PROGRAM PRODUCT FOR VIRTUAL REALITY MODELING UTILIZING ENCODING AND PROJECTION OF MULTIPLE DISTINCT VIEWS

(71) Applicant: Dell Products L.P., Round Rock, TX (US)

(72) Inventors: Zhisong Liu, Shenzhen (CN); Zijia Wang, Weifang (CN); Zhen Jia, Shanghai (CN); Sanping Li, Beijing (CN); Tianxiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 18/126,619

(22) Filed: Mar. 27, 2023

(65) Prior Publication Data

US 2024/0331276 A1 Oct. 3, 2024

(30) Foreign Application Priority Data

Feb. 28, 2023 (CN) .......................... 202310183674.9

(51) Int. Cl.
*G06T 15/04* (2011.01)
*G06F 3/01* (2006.01)
(Continued)

(52) U.S. Cl.
CPC .............. *G06T 17/00* (2013.01); *G06F 3/011* (2013.01); *G06T 7/40* (2013.01); *G06T 15/04* (2013.01); *G06V 10/44* (2022.01)

(58) Field of Classification Search
None
See application file for complete search history.

(56) References Cited

U.S. PATENT DOCUMENTS 12,062,146 B2 * 8/2024 Assouline .......... G06Q 30/0643
2019/0035149 A1 * 1/2019 Chen .................... G06V 40/166
(Continued)

OTHER PUBLICATIONS

A. Toshev et al., "DeepPose: Human Pose Estimation via Deep Neural Networks," arXiv:1312.4659v3, Aug. 20, 2014, 9 pages.
(Continued)

*Primary Examiner* — Joni Hsu
(74) *Attorney, Agent, or Firm* — Ryan, Mason & Lewis, LLP

(57) ABSTRACT

Embodiments of the present disclosure provide a method, an electronic device, and a computer program product for virtual reality modeling. The method includes obtaining a first image of a real object at a first viewing angle. The method further includes obtaining, based on the first image, an initial three-dimensional model corresponding to the real object. The method further includes determining a second image of the real object at a second viewing angle different from the first viewing angle by using the initial three-dimensional model. The second image has texture characteristics of the real object. The method further includes generating a target three-dimensional model used for virtual reality and corresponding to the real object by using the second image and the first image. Through the solution, a three-dimensional model which can reproduce a real object with high quality may be obtained based on a small number of input images.

20 Claims, 7 Drawing Sheets

(51) Int. Cl.
*G06T 7/40* (2017.01)
*G06T 17/00* (2006.01)
*G06V 10/44* (2022.01)

(56) References Cited

U.S. PATENT DOCUMENTS

| | | | | |
|---|---|---|---|---|
| 2019/0122411 | A1* | 4/2019 | Sachs | G06T 7/90 |
| 2021/0150802 | A1* | 5/2021 | Varekamp | H04N 13/194 |
| 2022/0188897 | A1* | 6/2022 | Szeli | G06T 7/70 |
| 2022/0343582 | A1* | 10/2022 | Anton Dominguez | G06F 30/20 |
| 2022/0406016 | A1* | 12/2022 | Gibbs | G06T 19/20 |
| 2023/0042078 | A1* | 2/2023 | Dijkstra-Soudarissanane | H04N 19/70 |
| 2023/0070514 | A1* | 3/2023 | Yuan | G06T 17/00 |
| 2024/0005617 | A1* | 1/2024 | Shakhrai | G06T 15/04 |

OTHER PUBLICATIONS

J. Wang et al., "Deep High-Resolution Representation Learning for Visual Recognition," arXiv:1908.07919v2, Mar. 13, 2020, 23 pages.

Z. Cao et al., "OpenPose: Realtime Multi-Person 2D Pose Estimation using Part Affinity Fields," arXiv:1812.08008v2, May 30, 2019, 14 pages.

G. Pavlakos et al., "Coarse-to-Fine Volumetric Prediction for Single-Image 3D Human Pose," arXiv:1611.07828v2, Jul. 26, 2017, 10 pages.

D. Pavllo et al., "3D Human Pose Estimation in Video With Temporal Convolutions and Semi-Supervised Training," arXiv:1811.11742v2, Mar. 29, 2019, 13 pages.

Y. Cheng et al., "Occlusion-Aware Networks for 3D Human Pose Estimation in Video," IEEE/CVF International Conference on Computer Vision, Oct. 2019, 10 pages.

M. Loper et al., "SMPL: A Skinned Multi-Person Linear Model," ACM Transactions on Graphics, vol. 34, No. 6, Nov. 2015, pp. 248:1-248:16.

G. Pavlakos et al., "Expressive Body Capture: 3D Hands, Face, and Body from a Single Image," arXiv:1904.05866v1, Apr. 11, 2019, 22 pages.

N. Mahmood et al., "AMASS: Archive of Motion Capture as Surface Shapes," arXiv:1904.03278v1, Apr. 5, 2019, 12 pages.

A. Kanazawa et al., "End-to-end Recovery of Human Shape and Pose," arXiv:1712.06584v2, Jun. 23, 2018, 10 pages.

M. Kocabas et al., "VIBE: Video Inference for Human Body Pose and Shape Estimation," arXiv:1912.05656v3, Apr. 29, 2020, 12 pages.

S. Saito et al., "PIFu: Pixel-Aligned Implicit Function for High-Resolution Clothed Human Digitization," arXiv:1905.05172v3, Dec. 3, 2019, 15 pages.

S. Saito et al., "PIFuHD: Multi-Level Pixel-Aligned Implicit Function for High-Resolution 3D Human Digitization," IEEE/CVF Conference on Computer Vision and Pattern Recognition, Jun. 2020, 10 pages.

Y. Xiu et al., "ICON: Implicit Clothed Humans Obtained from Normals," arXiv:2112.09127v2, Mar. 28, 2022, 22 pages.

U.S. Appl. No. 18/110,165, filed in the name of Zhisong Liu et al. on Feb. 15, 2023, and entitled "Method, Electronic Device, and Computer Program Product for Generating Three-Dimensional Model."

\* cited by examiner

METHOD, ELECTRONIC DEVICE, AND COMPUTER PROGRAM PRODUCT FOR VIRTUAL REALITY MODELING UTILIZING ENCODING AND PROJECTION OF MULTIPLE DISTINCT VIEWS

RELATED APPLICATION

The present application claims priority to Chinese Patent Application No. 202310183674.9, filed Feb. 28, 2023, and entitled "Method, Electronic Device, and Computer Program Product for Virtual Reality Modeling," which is incorporated by reference herein in its entirety.

FIELD

Embodiments of the present disclosure relate to the technical field of computers, and in particular to a method, an electronic device, and a computer program product for virtual reality modeling.

BACKGROUND

The term "metaverse" refers to a virtual world built utilizing digital technology, mapped from the real world or transcending the real world, and capable of interacting with the real world, thereby providing a digital life space of a new social system. The metaverse is integrated with technologies such as 5G, cloud computing, artificial intelligence, virtual reality, blockchain, digital currency, Internet of Things, and human-computer interaction.

Virtual reality may be popularly understood as combination of virtual and real worlds. Some virtual reality technology provides a computer simulation system capable of creating and experiencing a virtual world, which uses computers to generate a simulation environment so that users can be immersed in the environment. Such virtual reality technology uses data from real life and combines such data with various output devices through electronic signals generated by a computer technology so as to convert it into phenomena that people can interact with, and these phenomena may include real objects in reality or virtual representations that are presented through three-dimensional models.

SUMMARY

Illustrative embodiments of the present disclosure provide a solution for virtual reality modeling.

In a first aspect of the present disclosure, a method for virtual reality modeling is provided. The method includes: obtaining a first image of a real object at a first viewing angle; obtaining, based on the first image, an initial three-dimensional model corresponding to the real object; determining a second image of the real object at a second viewing angle different from the first viewing angle by using the initial three-dimensional model, the second image having texture characteristics of the real object; and generating a target three-dimensional model used for virtual reality and corresponding to the real object by using the second image and the first image.

In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to execute operations. The operations include: obtaining a first image of a real object at a first viewing angle; obtaining, based on the first image, an initial three-dimensional model corresponding to the real object; determining a second image of the real object at a second viewing angle different from the first viewing angle by using the initial three-dimensional model, the second image having texture characteristics of the real object; and generating a target three-dimensional model used for virtual reality and corresponding to the real object by using the second image and the first image.

In a third aspect of the present disclosure, a computer program product is provided. The computer program product is tangibly stored on a non-transitory computer-readable medium and includes computer-executable instructions, where the computer-executable instructions, when executed by a device, cause the device to perform the following operations: obtaining a first image of a real object at a first viewing angle; obtaining, based on the first image, an initial three-dimensional model corresponding to the real object; determining a second image of the real object at a second viewing angle different from the first viewing angle by using the initial three-dimensional model, the second image having texture characteristics of the real object; and generating a target three-dimensional model used for virtual reality and corresponding to the real object by using the second image and the first image.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent. The same reference numerals generally represent the same components in the example embodiments of the present disclosure.

DETAILED DESCRIPTION

Figure 1:
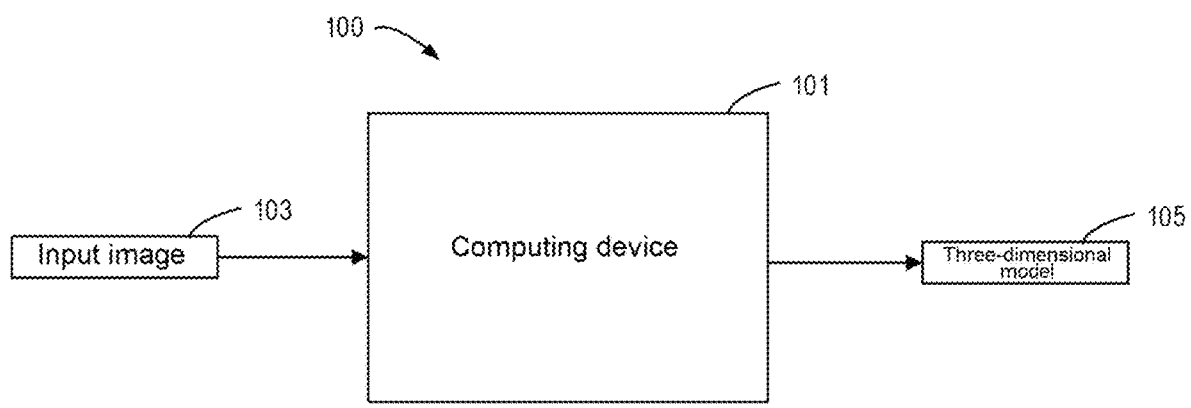
FIG. 1 shows a schematic diagram of an example environment in which embodiments of the present disclosure can be implemented.

Principles of the present disclosure will be described below with reference to several example embodiments illustrated in the accompanying drawings. Although the accompanying drawings show illustrative embodiments of the present disclosure, it is to be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless otherwise specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as "learning model," "learning network," "network model," or "model." A "neural network" or "neural network model" may be a deep learning model. In general, a machine learning model is capable of receiving input data, performing predictions based on the input data, and outputting a prediction result.

Generally, the machine learning model may include a plurality of processing layers, and each processing layer has a plurality of processing units. The processing units are sometimes also referred to as convolution kernels. In a convolution layer of a convolution neural network (CNN), the processing units are referred to as convolution kernels or convolution filters. The processing units in each processing layer perform corresponding changes on inputs of the processing layer based on corresponding parameters. An output from the processing layer is provided as an input to the next processing layer. An input to the first processing layer of the machine learning model is a model input to the machine learning model, and an output from the last processing layer is a model output from the machine learning model. An input to an intermediate processing layer is sometimes also referred to as features extracted by the machine learning model. Values of all parameters of the processing units of the machine learning model form a set of parameter values of the machine learning model.

Machine learning may mainly be divided into three stages, namely, a training stage, a testing stage, and an application stage (also referred to as an inference stage). In the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning a mapping or association relationship from inputs to outputs from training data. After training, a set of parameter values of the machine learning model is determined. In the testing stage, the trained machine learning model may be tested by using test samples to determine performance of the machine learning model. In the application stage, the machine learning model may be used for processing, based on the set of parameter values obtained from the training, actual input data to provide corresponding outputs.

One of the core functions of the metaverse is three-dimensional (3D) person digitization. Many applications of the metaverse need high-quality digital 3D persons, such as a customer center and a digital exhibition hall. Therefore, a reliable solution is needed to simulate a lifelike 3D digital person that can interact with a real person. The more digital human assets there are, the more diverse the applications that can be developed, and the faster they can move towards the real metaverse.

Some platforms (such as a virtual experience platform and a media exchange platform) use visual representation of an object. The virtual experience platform allows users to be interconnected, interact (such as in a virtual environment), create virtual experience, and share information with each other through the Internet. A user of the virtual experience platform may participate in a multi-person virtual environment (such as a 3D environment), design a customized environment, design a role or object, exchange virtual items/objects with other users, and use audio or text information to communicate with other users. Therefore, in order to implement interaction between the user and an object in the virtual environment, simulation is executed for the object in the virtual environment.

In some cases, simulation for the object may include construction of a digital 3D person model. The digital 3D person model is a 3D model that is virtualized through a computer technology and an image processing technology and can reflect 3D person appearance features. The 3D person model can be stored and visualized in a computer and can be adjusted and controlled at will. Compared with a real physical person model, the digital 3D person model is safer, more convenient, and more flexible.

With development of machine learning, deep learning technology may be applied to construction of the digital 3D person model. Construction of the digital 3D person model includes 3D person modeling and rendering. Research on a 3D person process originates from classic 2D person key point detection. At present, some technologies are proposed, which use feature representation capability of a deep neural network and learn human key points from a signal RGB image, where RGB denotes primary colors of red, green and blue, respectively. Different from 2D key point detection, 3D key point detection is more useful for 3D understanding. Human behaviors may be partially blocked and need to be separated by depth information. One of the solutions for learning depth information is to use a time series of body movement. For example, depth information may be estimated by learning a correlation between video frames. A more complicated method may implement control over a shape and a posture of a person model so as to improve quality of the person model. However, a digital 3D person model implemented by using an existing method is mainly a nude 3D model or a 3D model with clothes but without texture, so reproduction quality of a real person by an existing 3D model is poor, thus affecting user experience in virtual reality. Besides, these methods neither consider an influence caused by a camera posture, nor decompose a body shape in the direction of observation, which leads to difficult network learning.

In order to solve at least the above problems, an improved solution for virtual reality modeling is provided in example embodiments of the present disclosure. The solution is to obtain an initial three-dimensional model corresponding to a real object based on an image of the real object at a certain viewing angle. Then, an image of the real object at another viewing angle is determined by using the initial three-dimensional model. The image at another viewing angle has texture characteristics of the real object. Afterwards, a target three-dimensional model used for virtual reality and corresponding to the real object is generated by using the image at another viewing angle. In this way, the target three-dimensional model also has the texture characteristics of the real object, so that a three-dimensional model obtained by using embodiments of the present disclosure has high reproduction quality, and thus user experience in the virtual reality is improved.

FIG. 1 shows a schematic diagram of example environment 100 in which a plurality of embodiments of the present disclosure can be implemented. Example environment 100 includes computing device 101.

Computing device 101 may obtain input image 103 of a real object at one or more viewing angles. This embodiment of the present disclosure mainly takes a person (such as a service worker wearing a uniform) as the real object for description. It is to be understood that the real object herein may be any object, living or nonliving, in the real world, such as a counter and a dog. Computing device 101 may obtain input image 103 through camera shooting, and may also obtain input image 103 by extracting from a video or in other manners. The specific obtaining manner should not limit the present disclosure. In some embodiments, the input image 103 comprises an RGB image, although it is to be appreciated that other image types can be used for input image 103 in other embodiments.

Input image 103 has the texture characteristics of the real object. The texture characteristics may reflect visual features of homogeneous phenomena in the image, and reflect a surface tissue structure arrangement attribute of an object surface having a slow transformation or periodical change. For example, the texture characteristics may be a color of clothes on a human body, human skin color, clothes wrinkles, and the like.

Computing device 101 may use input image 103 to create three-dimensional model 105 used for virtual reality for the real object. Building of the virtual scene includes a three-dimensional modeling technology. In the virtual scene, the lifelikeness of a model usually determines a user's immersion in the virtual scene. Computing device 101 may restore three-dimensional information of an object in the real world based on a large amount of visual information contained in input image 103.

Example computing device 101 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any one or more of the above systems or devices, and the like. The server may be a cloud server, also referred to as a cloud computing server or a cloud host, and is a host product in a cloud computing service system, for solving defects of high management difficulty and weak business scalability in conventional physical hosts and virtual private server (VPS for short) services. The server may also be a server of a distributed system or a server combined with a blockchain.

Example embodiments for virtual reality modeling in the present disclosure will be discussed in more detail below with reference to the accompanying drawings.

Figure 2:
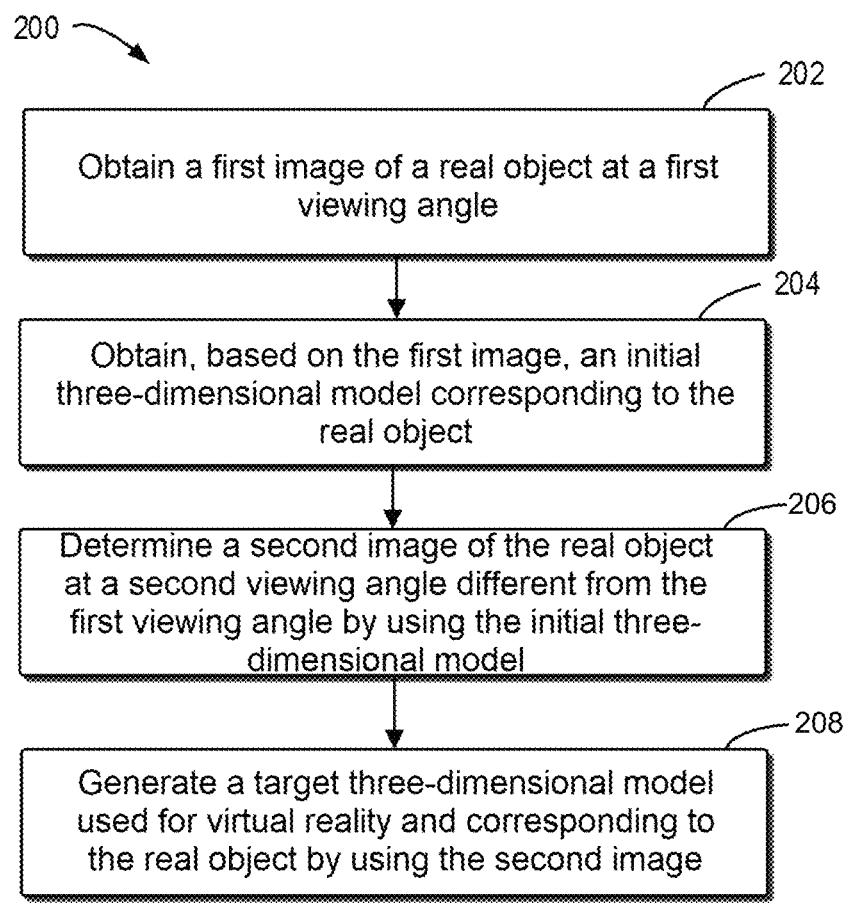
FIG. 2 shows a flow chart of a method for virtual reality modeling according to some embodiments of the present disclosure.

First referring to FIG. 2, a flow chart of method 200 for virtual reality modeling according to some embodiments of the present disclosure is shown. Method 200 may be executed by computing device 101 in FIG. 1 or any suitable computing device.

At block 202, a first image (namely, the input image in FIG. 3) of a real object at a first viewing angle is obtained. The real object in method 200 may be the real object described in FIG. 1. The first image in method 200 may be input image 103 described in FIG. 1, which is not repeated herein for the sake of being concise. The first viewing angle herein may be a viewing angle or a plurality of viewing angles. Correspondingly, the first image may be an image corresponding to the one viewing angle, or a plurality of images corresponding to the plurality of viewing angles, respectively. The more images obtained at block 202, the higher the reproduction quality of the target three-dimensional model obtained at block 208.

Figure 3:
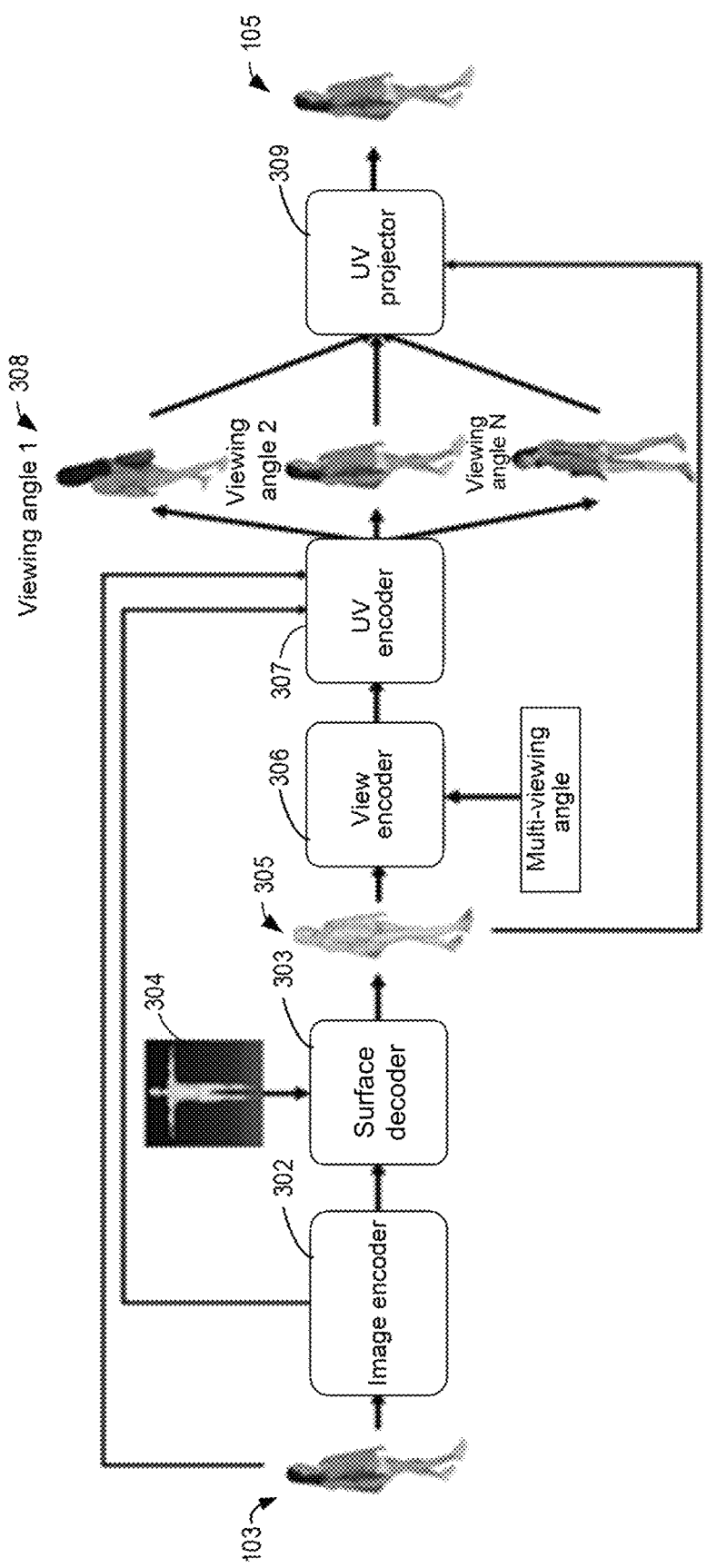
FIG. 3 shows a schematic diagram of a three-dimensional (3D) UV renderer for object digitization according to some embodiments of the present disclosure.

At block 204, an initial three-dimensional model corresponding to the real object is obtained based on the first image. In a case where a person is used as the real object, the initial three-dimensional model may be dressed-up three-dimensional person model 305, as shown in FIG. 3 below. The initial three-dimensional model may also be a nude three-dimensional person model.

In some embodiments, the initial three-dimensional model corresponding to the real object may be obtained in the following manner. First, a first image feature corresponding to the real object is obtained from the first image. The first image feature may be obtained from input image 103 by using image encoder 302 in FIG. 3. Afterwards, the initial three-dimensional model is generated based on the first image feature by using a three-dimensional model template. For example, as shown in FIG. 3, surface decoder 303 may generate the initial three-dimensional model based on three-dimensional model template 304 and an image feature obtained from input image 103. Three-dimensional model template 304 may be a skinned multi-person linear (SMPL) model, or any model template used for implementing transformation from two dimensions to three dimensions.

At block 206, a second image of the real object at a second viewing angle different from the first viewing angle is determined by using the initial three-dimensional model. The second image has texture characteristics of the real object. For example, the second viewing angle may be a viewing angle rotated by 60°, 90°, 120°, 180°, or the like relative to the first viewing angle. The texture characteristics in FIG. 1 may be referred to for the texture characteristics at block 206, which are not repeated here.

In some embodiments, the second image of the real object at the second viewing angle different from the first viewing angle may be determined in the following manner. First, a third image (such as image 401 shown in FIG. 4A) of the initial three-dimensional model at the second viewing angle is determined. For example, the third image may be determined based on each observation angle in one or a plurality of set observation angles through view encoder 306 shown in FIG. 3 and FIG. 4A. The larger the number of set observation angles, the more the second images determined at block 206, so the higher the reproduction quality for the real object by the target three-dimensional model obtained at block 208 may be. Afterwards, a second image feature corresponding to the initial three-dimensional model is obtained from the third image. For example, the second image feature may be obtained through a convolutional neural network arranged in UV encoder 307 shown in FIG. 3 and FIG. 4A. Afterwards, the second image (such as image 308 at viewing angle 1 to viewing angle 3 shown in FIG. 3, or image 308 output finally in FIG. 4A) is determined based on the second image feature and the first image. For example, the second image may be obtained through UV encoder 307 shown in FIG. 3 and FIG. 4A.

Figure 4A:
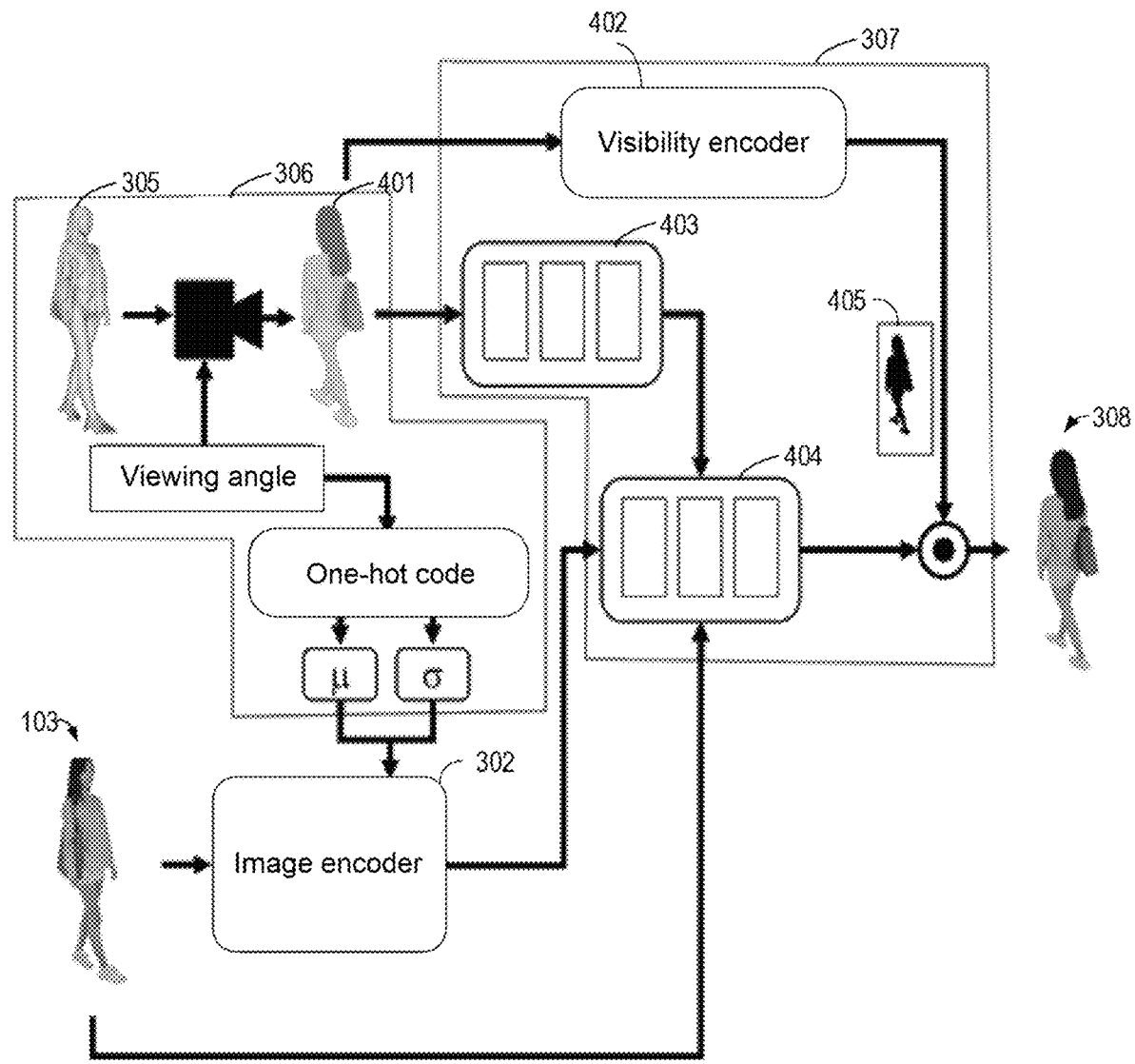
FIG. 4A shows a schematic diagram of a UV encoder and a view encoder according to some embodiments of the present disclosure.

In some embodiments, besides the second image feature and the first image, the second image herein may also be determined based on a third image feature obtained from the first image, corresponding to the real object, and processed through a constraint condition. For example, as shown in FIG. 4A, image features of the real object at corresponding viewing angles are obtained from a colored image (such as input image 103 illustratively comprising an RGB image in FIG. 4A) through image encoder 302 by using a mean value and a variance of a Gaussian-like distribution of various viewing angles in the second viewing angles as constraint conditions. In this way, the reproduction quality for the real object by the target three-dimensional model may be further improved.

In some embodiments, besides the second image feature, the first image, and the third image feature, the second image herein may also be determined based on a fourth image obtained by performing mask processing on the third image. For example, the fourth image may be a binary image obtained by performing mask processing on the third image through visibility encoder 402, and reference can be made to an illustration in FIG. 4A for details. In this way, by using the binary image, the obtained second image may implement good texture prediction at an object edge.

At block 208, the target three-dimensional model used for virtual reality and corresponding to the real object is generated by using the second image and the first image. For example, the second image obtained at block 206 is projected onto the initial three-dimensional model through UV projector 309 so as to obtain the target three-dimensional model (such as a three-dimensional person model obtained by coloring a dressed-up three-dimensional person model shown in FIG. 3 and FIG. 4B).

In some embodiments, the target three-dimensional model used for virtual reality and corresponding to the real object may be generated in the following manner. First, an initial texture map used for two-dimensional to three-dimensional projection is generated based on the second image, the first image, and the initial three-dimensional model. Alternatively, the initial texture map used for two-dimensional to three-dimensional projection is generated based on the plurality of second images and the initial three-dimensional model. The initial texture map may be a two-dimensional map under UV coordinates. Afterwards, the initial texture map is adjusted by using the initial three-dimensional model so as to generate a target texture map. The initial three-dimensional model may integrate texture information under UV coordinates for each pixel so as to obtain a texture map that can better represent the texture characteristics of the real object. Afterwards, the target three-dimensional model is generated based on the target texture map and the initial three-dimensional model. For example, the target texture map may be pasted into the initial three-dimensional model through the UV coordinates.

In some embodiments, the initial texture map may be adjusted in the following manner. First, a three-dimensional to two-dimensional displacement map (3D-2D displacement map) is generated based on the initial three-dimensional model. For example, a displacement map corresponding to the dressed-up three-dimensional person model may be generated through displacement encoder 406 shown in FIG. 4B. Afterwards, the initial texture map is adjusted based on the three-dimensional to two-dimensional displacement map. In this way, the adjustment of the initial texture map through the displacement map makes the target texture map closer to a geometrical shape of the initial three-dimensional model, so that the reproduction quality for the real object is further improved.

By using the above method, a three-dimensional model which can reproduce a real object with high quality may be obtained based on a small number of input images. In this way, model construction for virtual reality can be implemented simply and quickly while user experience in the virtual reality is improved.

Other embodiments for implementing improved solutions of the present disclosure will be described below with reference to FIG. 3 to FIG. 5. It is to be understood that the embodiment in FIG. 2 and the embodiments in FIG. 3 to FIG. 5 may refer to each other.

FIG. 3 shows a schematic diagram of a 3D UV renderer for object digitization according to some embodiments of the present disclosure. FIG. 3 shows the overall architecture of the 3D UV renderer used for implementing the improved solutions of the present disclosure. In some embodiments, the 3D UV renderer is illustratively configured to learn a plurality of views of the same 3D person, and then all views are projected back to the 3D person model by using UV projection, so that a colored 3D digital person is obtained.

As shown in FIG. 3, the 3D UV renderer takes input image 103 of a person as an input. It is assumed without limitation in this embodiment and others herein that input image 103 comprises an RGB image. Then, the RGB image is processed by using image encoder 302 to extract 2D features of the person. Surface decoder 303 takes the 2D features of the person and 3D model template 304 (illustratively an SMPL model template) as an input to render a 3D dressed-up person. The SMPL template is usually used for modeling of a 3D person. For example, 3D person model 305 is controlled by using a 10-D shape vector $\beta$ and a 23-D posture vector $\alpha$. Based on this, the 3D person model may be constructed as H=SMPL($\beta$,$\alpha$) and then transmitted to view encoder 306 and UV encoder 307 to be used for 2D reconstruction of a plurality of views 308$i$ (i=1, 2, ..., N), where i is an index of the i$^{th}$ view. Afterwards, multi-view projection is performed by using UV projector 309. UV projector 309 may use different numbers of view images as inputs for use in texture map prediction. The number of views for UV projection may be limited at will according to actual computing cost and resources.

Illustrative embodiments of the present disclosure consider that a user can usually provide only RGB images and there is no depth information at all in the RGB images. In order to realize robust and efficient 3D person digitization based on RGB, a deep neural network is provided to explore the mapping correlation between RGB images and a 3D model. As for a person, strong priori knowledge may be extracted from training data, for example, a shape and a motion. All of them may be learned through the neural network to be used for depth estimation. Compared with an existing 3D modeling method, it can not only effectively predict the texture of the 3D person model, but also restore its color with high-resolution visual quality.

A 3D UV renderer architecture shown in FIG. 3 may perform 3D person modeling by using multi-view UV estimation and projection and may also use a graph convolutional neural network for texture map adjustment. It may be seen that the 3D UV renderer mainly includes the UV projector, the UV encoder, and the view encoder. The UV projector, the UV encoder, and the view encoder will be further described in detail below with reference to FIG. 4A and FIG. 4B.

FIG. 4A is a schematic diagram of a UV encoder and a view encoder according to some embodiments of the present disclosure. In FIG. 4A, UV encoder 307 and view encoder 306 are shown in block regions, respectively.

In principle, view encoder 306 may rotate dressed-up 3D person model 305 by using any viewing angle $\theta$ and provide a constraint condition for image features. In order to rotate dressed-up 3D person model 305, it may be assumed that a virtual camera is placed according to a given viewing angle and then takes a picture P=cam(H, θ) of dressed-up 3D person model 305, where P is output image 401 (namely, the third image herein), H is the 3D person, and cam is a projection from 3D to 2D. View encoder 306 may also use a one-hot code of a camera posture as an input to the convolutional neural network so as to learn a posture condition as o=G(μ, σ), where μ and σ are a mean value and a variance of the Gaussian-like posture distribution. The image feature T (namely, the first image feature herein) may be adjusted through the following Equation (1):

$$T' = \text{norm}(T) * (1 + \sigma) + \mu \qquad (1)$$

where T' is the image feature processed through a constraint condition (namely, the third image feature herein), and norm is a normalization process of normalizing an original image feature T to a mean value 0 and a variance 1.

UV encoder 307 may use existing visibility encoder 402 to predict visibility graphical representation 405 (namely, the fourth image herein) from the dressed-up 3D person model. Visibility graphical representation 405 may be represented by M here. Visibility graphical representation 405 describes whether pixels of the surface of the 3D person are visible ("1") or invisible ("0") to a camera. Two small convolutional neural networks 403 and 404 are additionally arranged in UV encoder 307 to process a projected 2D image P and an original image I (namely, the first image herein) and an image feature T' processed through the constraint condition. Therefore, multiple views 308 predictable by using view encoder 306 and visibility encoder 402 (namely, the second image herein) may be obtained through the following Equation (2):

$$V_o = U(P, T', I) \cdot M \qquad (2)$$

where Vo represents the $o^{th}$ view of the 3D person model. A visibility map M is used here as an outline to cut the shape of the 3D person so as to have a clear boundary.

Figure 4B:
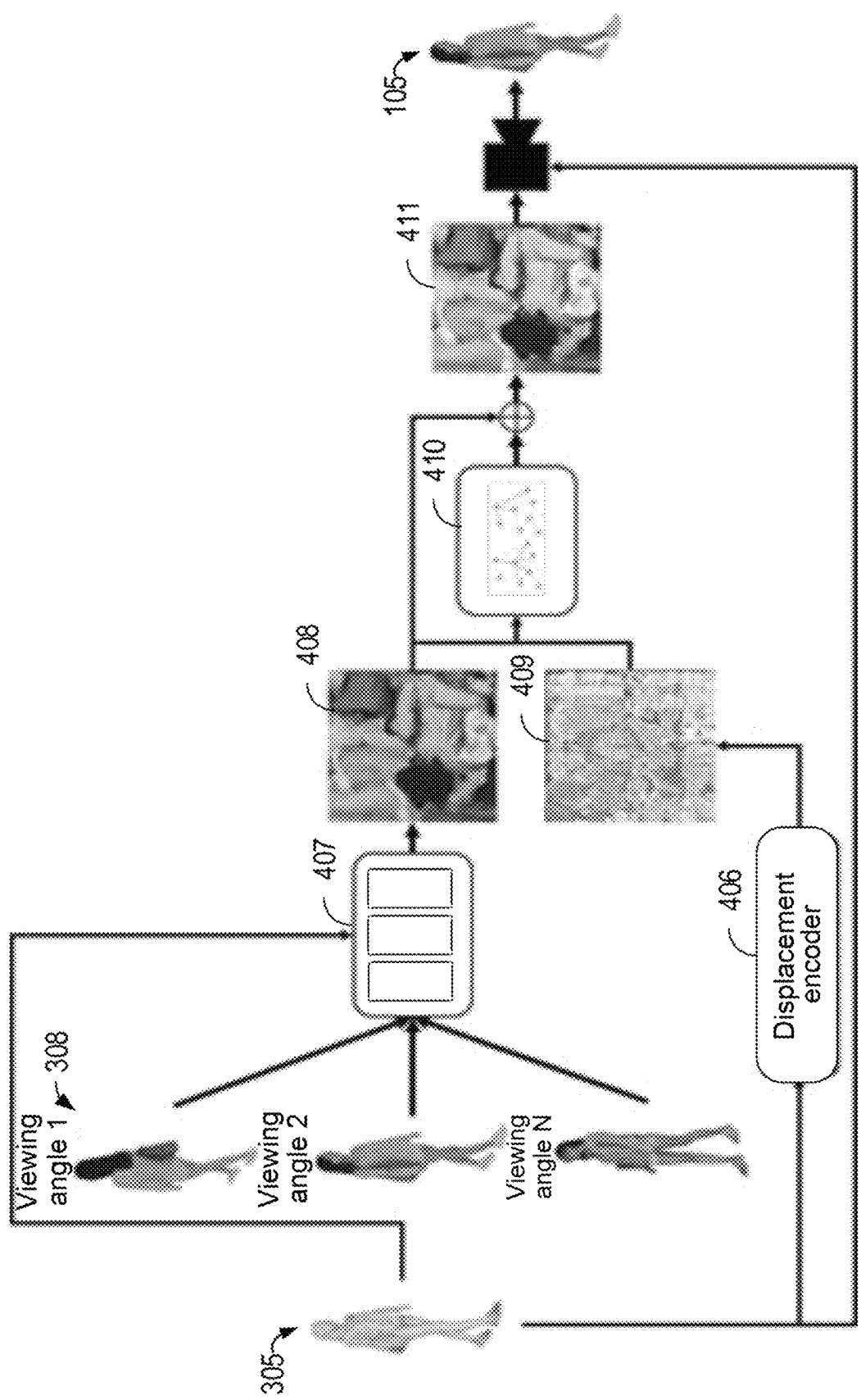
FIG. 4B shows a schematic diagram of a UV projector according to some embodiments of the present disclosure.
Figure 5:
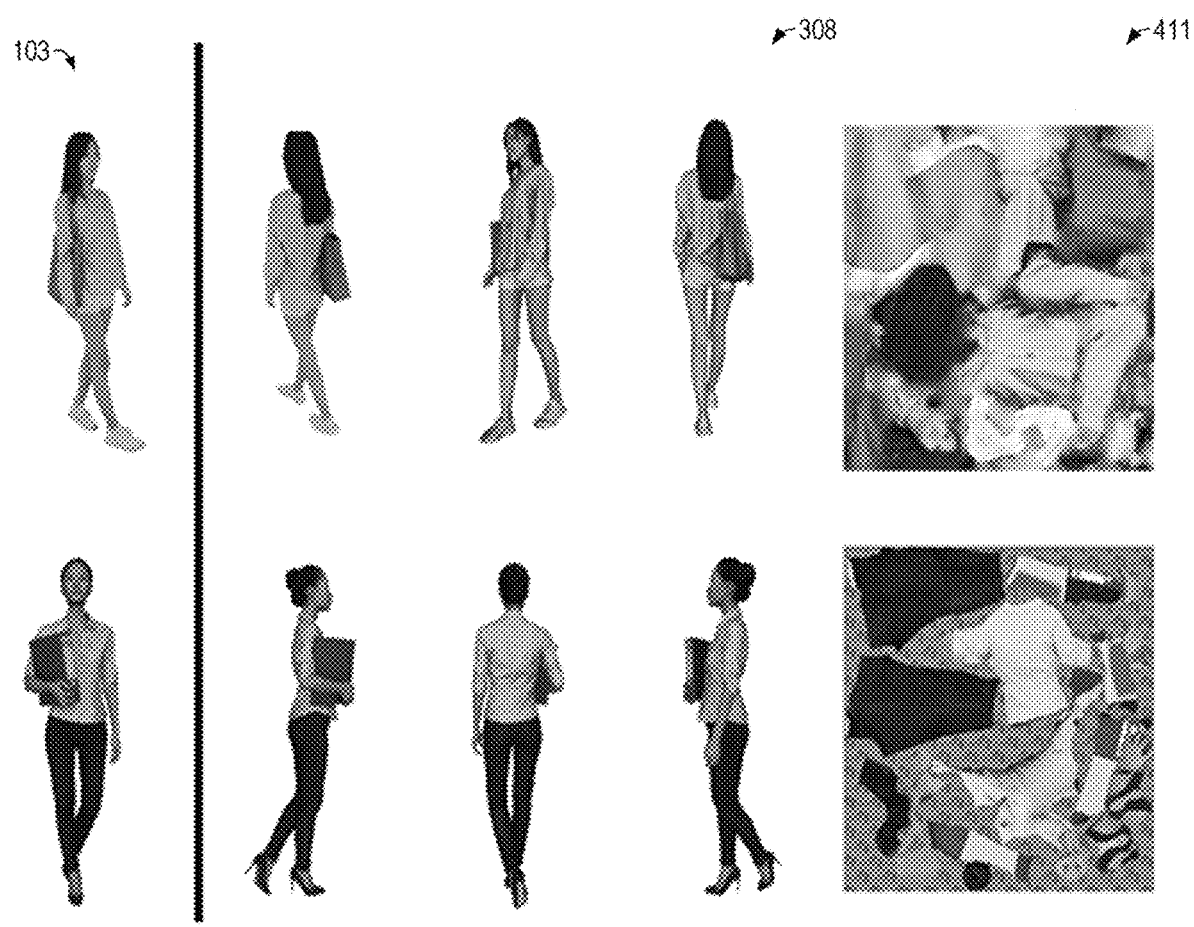
FIG. 5 shows a use case of a method according to some embodiments of the present disclosure.

FIG. 4B is a schematic diagram of a UV projector according to some embodiments of the present disclosure. As shown in FIG. 4B, UV projector 309 uses a dressed-up original 3D person model 305 and multiple views 308 to predict texture map 411. The executing process of UV projector 309 may include two parts: 1) initial texture map E estimation and 2) adjustment of the initial texture map. First, small convolutional neural network 407 is used to process all views so as to generate initial texture map 408, namely, 2D projection of the texture of the 3D person. Meanwhile, UV projector 309 may also predict the 3D-2D displacement map A=(ui, vi), where 0<i<X, 0<j<Y. 3D-2D displacement map 409 represents a mapping relationship between 3D coordinates and 2D coordinates. Then, UV projector 309 may combine A and E to Laplacian mapping 410, and the graph convolutional neural network is used to learn a graphical representation for use in adjustment of the initial texture map. In mathematics, adjusted texture map 411 (namely, the target texture map herein) may be represented as E'=E+R(A, E). Finally, UV projector 309 wraps the adjusted texture map to the dressed-up 3D person model so as to obtain colored 3D model 105. In this way, multi-view UV projection may be implemented by using a simple non-learning method to enhance 3D visual quality.

By using the improved solution for 3D person digitization provided by the present disclosure, a plurality of views of a given RGB image may be predicted so as to implement lifelike 3D visualization. Embodiments of the present disclosure may be applied not only to new view synthesis, but also to 3D person rendering. FIG. 5 shows a use case of the solution of the present disclosure. Through the improved solution of the present disclosure, based on a small number of input views (for example, one view), other invisible views may be predicted, such as views observed from viewing angles of 90°, 180°, and 270° respectively with respect to the input views shown in FIG. 5. Then, the texture map shown in FIG. 5 may also be predicted based on the plurality of predicted views so as to be used for rendering the 3D person model.

Besides, the improved solution of the present disclosure implements a simple and efficient 3D person digitization technology. The technology can learn 3D data from one RGB image and thus is applicable to many devices, such as a mobile phone and a laptop computer. A good 3D person model may be directly deployed to the metaverse for use in many applications and may provide a 3D customized service for a user.

As described above, the present disclosure provides a 3D UV renderer for 3D person digitization. The 3D UV renderer may generate a high-quality 3D person model which reproduces a real person. Specifically, model generation based on camera posture may be supervised by using the UV encoder and the UV projector. 3D transformation is clearly applied to the 3D person model, so that shape and texture may be estimated to implement better 2D reconstruction. Experiments further prove that the improved solution of the present disclosure may predict a new view with high visual quality. Such illustrative embodiments provide significant advantages in many applications.

Figure 6:
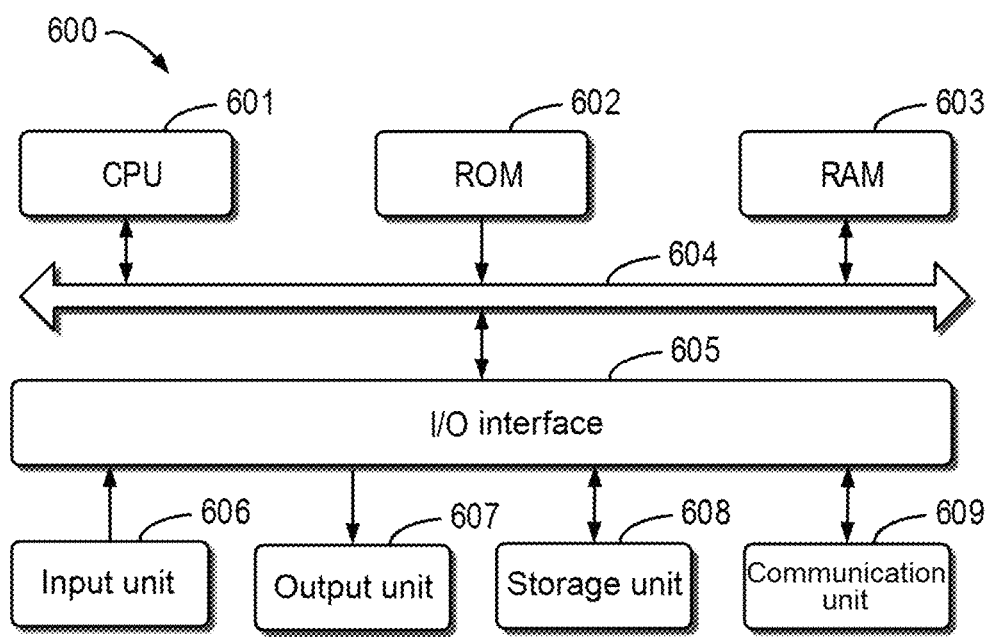
FIG. 6 shows a block diagram of an example device that can be used for implementing embodiments of the present disclosure.

FIG. 6 shows a schematic block diagram of example device 600 that may be configured to implement embodiments of the present disclosure. Device 600 may be configured to implement method 200 of FIG. 2. As shown in FIG. 6, device 600 includes central processing unit (CPU) 601 that may perform various appropriate operations and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. One or more operations of method 200 described above may be performed when the computer program is loaded into RAM 603 and executed by CPU 601.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any type of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It is to be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or other programmable data processing apparatuses, thereby producing a machine, such that these instructions, when executed by the processing unit of the computer or the other programmable data processing apparatuses, produce an apparatus for implementing functions/operations specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium storing instructions includes an article of manufacture that includes instructions that implement various aspects of the functions/operations specified in one or a plurality of blocks in the flow charts and/or block diagrams.

The computer-readable program instructions may also be loaded to a computer, other programmable data processing apparatuses, or other devices, so that a series of operating steps may be performed on the computer, the other programmable data processing apparatuses, or the other devices to produce a computer-implemented process, such that the instructions executed on the computer, the other programmable data processing apparatuses, or the other devices implement the functions/operations specified in one or a plurality of blocks in the flow charts and/or block diagrams.

The flow charts and block diagrams in the accompanying drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It is to be further noted that each block in the block diagrams and/or flow charts as well as a combination of blocks in the block diagrams and/or flow charts may be implemented by using a special hardware-based system that executes specified functions or operations, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the various embodiments disclosed herein.

What is claimed is:

1. A method for virtual reality modeling, comprising:
    obtaining a first image of a real object at a first viewing angle;
    obtaining, based on the first image, an initial three-dimensional model corresponding to the real object;
    determining a second image of the real object at a second viewing angle different from the first viewing angle by using the initial three-dimensional model, the second image having texture characteristics of the real object; and
    generating a target three-dimensional model used for virtual reality and corresponding to the real object by using the second image and the first image;
    wherein determining the second image of the real object at the second viewing angle comprises encoding a plurality of different views, generated by the initial three-dimensional model at respective different viewing angles, in a view encoder, and processing the encoded views in a two-dimensional encoder coupled to the view encoder to generate respective corresponding two-dimensional views, the second image corresponding to a particular one of the two-dimensional views, the view encoder being further configured to encode camera postures of the viewing angles in association with mean and variance values of a corresponding posture distribution, the two-dimensional encoder comprising a visibility encoder and first and second convolutional neural networks, the visibility encoder and the first convolutional neural network each receiving as respective inputs an encoded view from the view encoder, the second convolutional neural network receiving as inputs the first image and an output of the first convolution neural network, the second image being generated as a function of outputs of the visibility encoder and the second convolutional neural network; and
    wherein generating the target three-dimensional model comprises applying the two-dimensional views to a two-dimensional to three-dimensional projector to project the two-dimensional views into three dimensions based on one or more texture maps in forming the target three-dimensional model.

2. The method according to claim 1, wherein obtaining the initial three-dimensional model corresponding to the real object comprises:
    obtaining a first image feature corresponding to the real object from the first image; and
    generating the initial three-dimensional model based on the first image feature by using a three-dimensional model template.

3. The method according to claim 1, wherein determining the second image of the real object at the second viewing angle different from the first viewing angle comprises:
    determining a third image of the initial three-dimensional model at the second viewing angle;
    obtaining a second image feature corresponding to the initial three-dimensional model from the third image; and
    determining the second image based on the second image feature and the first image.

4. The method according to claim 1, wherein determining the second image of the real object at the second viewing angle different from the first viewing angle comprises:
    determining a third image of the initial three-dimensional model at the second viewing angle, obtaining a second image feature corresponding to the initial three-dimensional model from the third image;
    obtaining, from the first image and using a constraint condition corresponding to the second viewing angle, a third image feature corresponding to the real object and processed through the constraint condition; and
    determining the second image based on the second image feature, the first image, and the third image feature.

5. The method according to claim 1, wherein determining the second image of the real object at the second viewing angle different from the first viewing angle comprises:
    determining a third image of the initial three-dimensional model at the second viewing angle;
    obtaining a second image feature corresponding to the initial three-dimensional model from the third image;
    obtaining, from the first image and using a constraint condition corresponding to the second viewing angle, a third image feature corresponding to the real object and processed through the constraint condition;
    obtaining a fourth image of the initial three-dimensional model at the second viewing angle by performing mask processing on the third image; and
    determining the second image based on the second image feature, the first image, the third image feature, and the fourth image.

6. The method according to claim 5, wherein the fourth image is a binary image.

7. The method according to claim 1, wherein generating the target three- dimensional model used for virtual reality and corresponding to the real object comprises:
    generating an initial texture map for two-dimensional to three-dimensional projection based on the second image, the first image, and the initial three-dimensional model;
    adjusting the initial texture map by using the initial three-dimensional model to generate a target texture map; and
    generating the target three-dimensional model based on the target texture map and the initial three-dimensional model.

8. The method according to claim 7, wherein adjusting the initial texture map comprises:
    generating a three-dimensional to two-dimensional displacement map based on the initial three-dimensional model; and
    adjusting the initial texture map based on the three-dimensional to two-dimensional displacement map.

9. The method according to claim 1, wherein the initial three-dimensional model is a nude three-dimensional model or a dressed-up three-dimensional model corresponding to the real object.

10. An electronic device, comprising:
at least one processor; and
at least one memory storing computer-executable instructions, the at least one memory and the computer-executable instructions being configured to cause, together with the at least one processor, the electronic device to perform operations comprising:
obtaining a first image of a real object at a first viewing angle;
obtaining, based on the first image, an initial three-dimensional model corresponding to the real object;
determining a second image of the real object at a second viewing angle different from the first viewing angle by using the initial three-dimensional model, the second image having texture characteristics of the real object; and
generating a target three-dimensional model used for virtual reality and corresponding to the real object by using the second image and the first image;
wherein determining the second image of the real object at the second viewing angle comprises encoding a plurality of different views, generated by the initial three-dimensional model at respective different viewing angles, in a view encoder, and processing the encoded views in a two-dimensional encoder coupled to the view encoder to generate respective corresponding two-dimensional views, the second image corresponding to a particular one of the two-dimensional views, the view encoder being further configured to encode camera postures of the viewing angles in association with mean and variance values of a corresponding posture distribution, the two-dimensional encoder comprising a visibility encoder and first and second convolutional neural networks, the visibility encoder and the first convolutional neural network each receiving as respective inputs an encoded view from the view encoder, the second convolutional neural network receiving as inputs the first image and an output of the first convolution neural network, the second image being generated as a function of outputs of the visibility encoder and the second convolutional neural network; and
wherein generating the target three-dimensional model comprises applying the two-dimensional views to a two-dimensional to three-dimensional projector to project the two-dimensional views into three dimensions based on one or more texture maps in forming the target three-dimensional model.

11. The electronic device according to claim 10, wherein obtaining the initial three-dimensional model corresponding to the real object comprises:
obtaining a first image feature corresponding to the real object from the first image; and
generating the initial three-dimensional model based on the first image feature by using a three-dimensional model template.

12. The electronic device according to claim 10, wherein determining the second image of the real object at the second viewing angle different from the first viewing angle comprises:
determining a third image of the initial three-dimensional model at the second viewing angle;
obtaining a second image feature corresponding to the initial three-dimensional model from the third image; and
determining the second image based on the second image feature and the first image.

13. The electronic device according to claim 10, wherein determining the second image of the real object at the second viewing angle different from the first viewing angle comprises:
determining a third image of the initial three-dimensional model at the second viewing angle;
obtaining a second image feature corresponding to the initial three-dimensional model from the third image;
obtaining, from the first image and using a constraint condition corresponding to the second viewing angle, a third image feature corresponding to the real object and processed through the constraint condition; and
determining the second image based on the second image feature, the first image, and the third image feature.

14. The electronic device according to claim 10, wherein determining the second image of the real object at the second viewing angle different from the first viewing angle comprises:
determining a third image of the initial three-dimensional model at the second viewing angle;
obtaining a second image feature corresponding to the initial three-dimensional model from the third image;
obtaining, from the first image and using a constraint condition corresponding to the second viewing angle, a third image feature corresponding to the real object and processed through the constraint condition;
obtaining a fourth image of the initial three-dimensional model at the second viewing angle by performing mask processing on the third image; and
determining the second image based on the second image feature, the first image, the third image feature, and the fourth image.

15. The electronic device according to claim 14, wherein the fourth image is a binary image.

16. The electronic device according to claim 10, wherein generating the target three-dimensional model used for virtual reality and corresponding to the real object comprises:
generating an initial texture map for two-dimensional to three-dimensional projection based on the second image, the first image, and the initial three-dimensional model;
adjusting the initial texture map by using the initial three-dimensional model to generate a target texture map; and
generating the target three-dimensional model based on the target texture map and the initial three-dimensional model.

17. The electronic device according to claim 16, wherein adjusting the initial texture map comprises:
generating a three-dimensional to two-dimensional displacement map based on the initial three-dimensional model; and
adjusting the initial texture map based on the three-dimensional to two-dimensional displacement map.

18. The electronic device according to claim 10, wherein the initial three-dimensional model is a nude three-dimensional model or a dressed-up three-dimensional model corresponding to the real object.

19. A computer program product, tangibly stored on a non-transitory computer-readable medium and comprising computer-executable instructions, wherein the computer-executable instructions, when executed by a device, cause the device to perform the following operations:
obtaining a first image of a real object at a first viewing angle;

obtaining, based on the first image, an initial three-dimensional model corresponding to the real object;

determining a second image of the real object at a second viewing angle different from the first viewing angle by using the initial three-dimensional model, the second image having texture characteristics of the real object; and generating a target three-dimensional model used for virtual reality and corresponding to the real object by using the second image and the first image;

wherein determining the second image of the real object at the second viewing angle comprises encoding a plurality of different views, generated by the initial three-dimensional model at respective different viewing angles, in a view encoder, and processing the encoded views in a two-dimensional encoder coupled to the view encoder to generate respective corresponding two-dimensional views, the second image corresponding to a particular one of the two-dimensional views, the view encoder being further configured to encode camera postures of the viewing angles in association with mean and variance values of a corresponding posture distribution, the two-dimensional encoder comprising a visibility encoder and first and second convolutional neural networks, the visibility encoder and the first convolutional neural network each receiving as respective inputs an encoded view from the view encoder, the second convolutional neural network receiving as inputs the first image and an output of the first convolution neural network, the second image being generated as a function of outputs of the visibility encoder and the second convolutional neural network; and wherein generating the target three-dimensional model comprises applying the two-dimensional views to a two-dimensional to three-dimensional projector to project the two-dimensional views into three dimensions based on one or more texture maps in forming the target three-dimensional model.

20. The computer program product according to claim 19, wherein determining the second image of the real object at the second viewing angle different from the first viewing angle comprises:

determining a third image of the initial three-dimensional model at the second viewing angle;

obtaining a second image feature corresponding to the initial three-dimensional model from the third image; and determining the second image based on the second image feature and the first image.

* * * * *